United States Patent
Zürbes

(10) Patent No.: US 7,142,593 B2
(45) Date of Patent: Nov. 28, 2006

(54) METHOD OF AND SYSTEM FOR INTERFERENCE MEASUREMENT

(75) Inventor: Stefan Zürbes, Heroldsberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 773 days.

(21) Appl. No.: 10/368,542

(22) Filed: Feb. 18, 2003

(65) Prior Publication Data

US 2003/0156634 A1    Aug. 21, 2003

(30) Foreign Application Priority Data

Feb. 19, 2002   (EP)   ................................. 02003781

(51) Int. Cl.
    *H04Q 1/20*   (2006.01)
(52) U.S. Cl. ................ 375/227; 455/226.1; 455/226.2; 455/226.3; 455/501
(58) Field of Classification Search ................ 375/227; 455/277.2, 501, 63.1, 114.2, 226.1, 226.2, 455/226.3
    See application file for complete search history.

(56) References Cited

U.S. PATENT DOCUMENTS

| | | | | |
|---|---|---|---|---|
| 5,497,503 A | * | 3/1996 | Rydberg et al. | ............ 455/454 |
| 5,809,059 A | * | 9/1998 | Souissi et al. | ............... 375/133 |
| 5,940,748 A | * | 8/1999 | Daughtry et al. | ......... 455/182.2 |
| 6,332,072 B1 | * | 12/2001 | Johnson et al. | ........... 455/277.1 |
| 6,418,317 B1 | * | 7/2002 | Cuffaro et al. | ............... 455/450 |
| 6,580,703 B1 | * | 6/2003 | Okubo et al. | ................ 370/335 |
| 6,581,047 B1 | * | 6/2003 | Raykhman et al. | ........... 706/21 |
| 2002/0101908 A1 | * | 8/2002 | Kim et al. | .................... 375/147 |
| 2003/0003906 A1 | * | 1/2003 | Demers et al. | ............. 455/424 |

* cited by examiner

Primary Examiner—Mohammed Ghayour
Assistant Examiner—Leila Malek

(57) ABSTRACT

An evaluation of the interference situation of a transmission system is performed. If valid payload data is received, a counter for valid receptions is incremented and a signal power at which the payload data was received is stored. If invalid payload data is received, a counter for invalid receptions is incremented. If no payload data has to be received, the signal power is measured in order to consider the signal power as interference power. The ratio of the signal power measured during a valid reception and as the interference power is calculated as a fictive signal-to-interference power ratio.

4 Claims, 2 Drawing Sheets

METHOD OF AND SYSTEM FOR INTERFERENCE MEASUREMENT

BACKGROUND OF THE INVENTION

1. Field of the Invention

The present invention relates generally to data transmission systems and, more particularly, to measurement of interference in data transmission systems.

2. Description of Related Art

In transmission systems, transmitted data often is affected by concurrent transmission on the same frequency range or neighboring frequency ranges. Therefore, the design of some systems provides a plurality of transmission channels of which any channel or any subset of channels of the plurality of channels may be selected for transmission. Before a channel is chosen for transmission, interference of concurrent transmissions on that channel is measured. If the interference is considered too high, another channel is chosen. A change of the transmission channel may be also performed in the course of a transmission if the interference situation of the chosen channel worsens (i.e. systems with dynamic channel selection or re-selection). Frequency-hopping systems are also examples of systems with interference measurement. The frequency-hopping systems change the transmission channel at given time instants to achieve a statistical distribution of the interferers.

Typically, the quality of all possible channels is assessed by measurement samples of the received signal strength of the wanted transmissions and the signal strengths of interfering transmissions. In a next step, a set of interference measurements, or signal-to-interference power ratios calculated from the set of interference measurements, are usually further condensed into meaningful representative values. The meaningful representative values could, for example, be the mean of the measurements, the maximum or minimum, or the empirical distribution or samples thereof.

The condensation from the measurement samples into the meaningful representative values is especially relevant when the measuring device must report its measurements to other devices, which then may, for example, decide to perform a channel reselection or a hop set adaptation. Since the measuring-device reports compete with user traffic for the available transmission capacity, it is desirable to use only as many bits as necessary to report measurement results. If the measurements are performed at a decision-making device, it is also desirable to condense the measurement values in order to reduce the memory requirements.

Today, many digital transmission systems use packetized transmission (i.e. the information is grouped and sent within bursts). As a consequence, the transmitted power is not constant over time, but is ramped up at the beginning of a burst transmission and ramped down at the end of the burst. Further, several wireless transmission systems use time-division duplex, frequency hopping, or do not transmit power during idle times of the transmission system. For any of these reasons, the interference power in the case of interference by such systems is significantly time variant. In addition, the received power of the wanted link can be time variant, such as, for example, due to fading, especially if frequency hopping is applied.

The time variance of the received interference power is especially strong if the spatial distance to the interferer also exhibits a strong variance, as is commonly the case in uncoordinated wireless personal area systems such as BLUETOOTH. In contrast, typical cellular systems usually exhibit relatively small system internal interferer distance variations, and thus significantly smaller interference power variations.

Packet data transmission systems usually provide means to determine the integrity of the received data. Determination of the integrity of the received data is normally done by adding redundancy to the information content, such as, for example, by cyclical redundancy check (CRC) information. If the CRC succeeds at the receiver, the content of the respective packet (or packet part) protected by this CRC is considered to be valid.

As described above, it is important to condense the measurement outcomes of the interference measurements to a small number of meaningful representative values in order to reduce the amount of data to transmit per measurement report, while at the same time retain the statistical significance of the measurements. The average of the measurement samples is usually a good candidate for such a meaningful representative.

SUMMARY OF THE INVENTION

It is therefore an object of the invention to provide a method and system that provides reliable interference information, especially for packet transmission systems at a minimum of implementation costs. In an embodiment of the invention, a method of evaluating the interference situation of a transmission system includes, in case of receipt of valid payload data, increasing a counter for valid receptions and storing signal power at which the payload data was received. The method also includes, in case of receipt of invalid payload data, increasing a counter for invalid receptions and, in case no payload data has to be received, measuring the signal power in order to consider the signal power to be interference power. The method also includes calculating the ratio of the signal power measured during a valid reception and the interference power as a fictive signal-to-interference power ratio. The measurements can be evaluated for separate frequencies. The fictive signal-to-interference power ratio can be classified. The classification can be a mapping to a binary value.

In another embodiment of the invention, a transmission system applies the method steps listed above. In another embodiment of the invention, a report of the measurement is transmitted from a first transceiver to a second transceiver and the second transceiver decides based on the transmitted measurement which frequencies the transmissions are carried out.

In another embodiment of the invention, a method of evaluating an interference situation of a transmission system includes, responsive to receipt of valid payload data, increasing a counter for valid receptions and storing a valid-payload-data signal power. The method also includes, responsive to receipt of invalid payload data, increasing a counter for invalid receptions. Responsive to receipt of no payload data, signal power is measured in order to consider the signal power as interference power, a ratio is calculated of the signal power measured during a valid reception and the interference power as a fictive signal-to-interference power ratio, and a determination is made whether a signal-to-interference ratio is sufficient. Responsive to a determination that the signal-to-interference ratio is sufficient, the counter for valid receptions is increased. Responsive to a determination that the signal-to-interference ratio is not sufficient, the counter for invalid receptions is increased.

In another embodiment of the invention, a transmission system includes means for increasing a counter for valid receptions and storing a valid-payload-data signal power responsive to receipt of valid payload data, means for increasing a counter for invalid receptions responsive to receipt of invalid payload data, means for measuring signal power in order to consider the signal power as interference power responsive to receipt of no payload data, means for calculating a ratio of the signal power measured during a valid reception and the interference power as a fictive signal-to-interference power ratio responsive to receipt of no payload data, and means for determining whether a signal-to-interference ratio is sufficient responsive to receipt of no payload data. The system also includes means for increasing the counter for valid receptions responsive to a determination that the signal-to-interference ratio is sufficient and means for increasing the counter for invalid receptions responsive to a determination that the signal-to-interference ratio is not sufficient.

BRIEF DESCRIPTION OF THE DRAWINGS

An embodiment of the present invention is described below, by way of example only, with reference to the accompanying drawings, in which.

DETAILED DESCRIPTION OF PREFERRED EXEMPLARY EMBODIMENTS OF THE INVENTION

Figure 1:
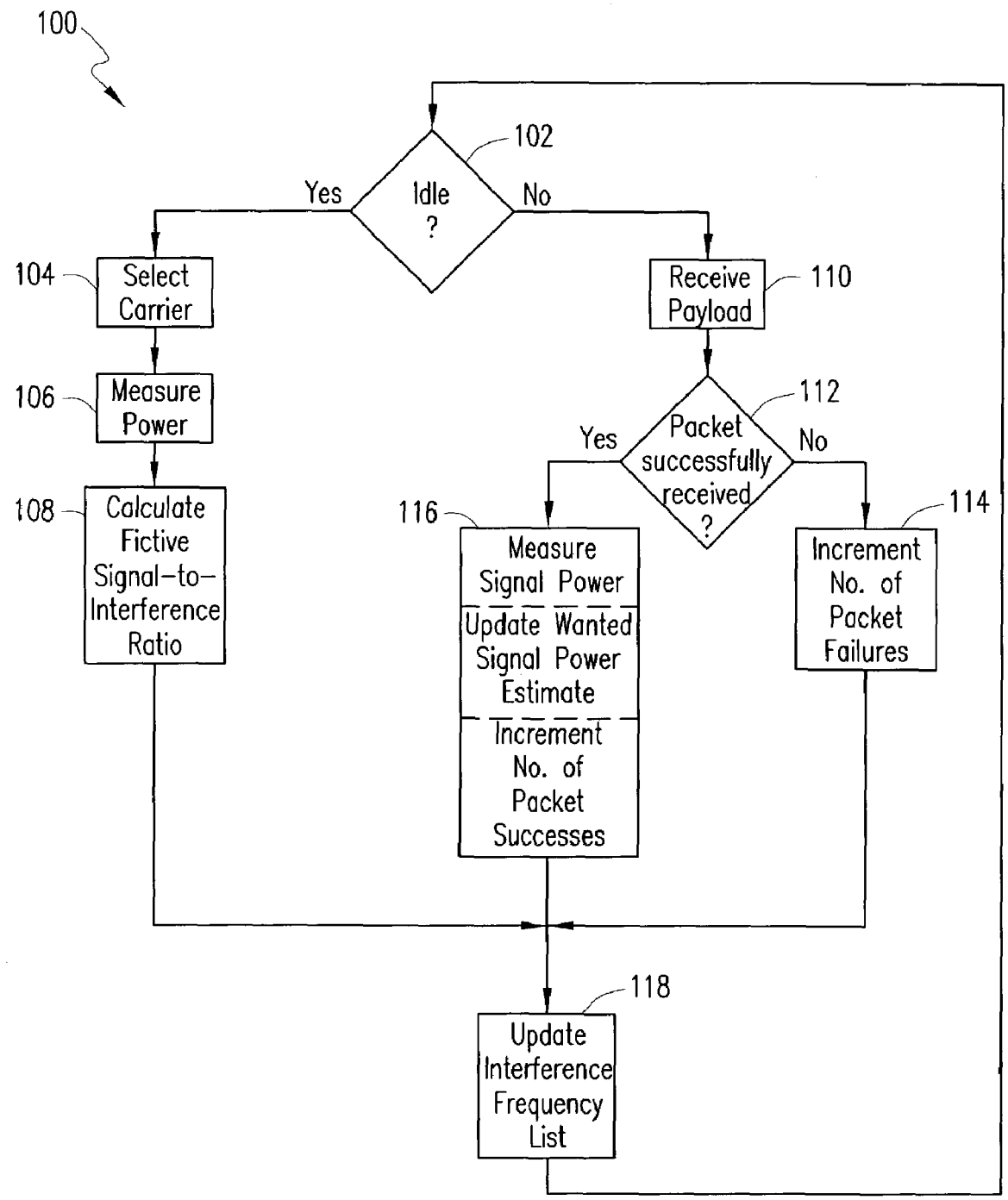
FIG. 1 shows a diagram with method steps of an embodiment of the invention.

An advantage of the embodiments of the present invention is to use the estimated packet (or packet part) failure probability (of a fictive packet transmission at the time when the interference power is measured) as the measure to describe the transmission quality of a certain carrier used by a wireless packet data transmission system. In contrast to prior art solutions that use (averaged) interference power or signal-to-interference ratio measurements on a carrier, a performance measure in accordance with principles of the invention is well-suited to deliver accurate information on the influence of interference on the packet data transmission quality on a carrier, even if the interference is intermittent or otherwise strongly time variant.

In the context of a packet data transmission system that is interfered by strongly time variant, bursty, interference, the average or some percentage of the measurement sample distribution are, however, in general, not meaningful representatives due to the fact that transmission performance is not determined by, for example, the mean signal-to-interference power ratio or a minimum thereof Instead, the success of a certain packet is determined by an instantaneous signal-to-interference ratio observed for a specific packet.

Thus, even if, for example, the mean of the signal-to-interference ratio measurement samples is higher than the protection ratio requirement of the receiver, some packets will fail, since the instantaneous signal-to-interference ratio for the failed packets is below the protection ratio. On the other hand, if the mean of the signal-to-interference ratio measurement samples is lower than the protection ratio, some packets will nonetheless succeed, since the instantaneous signal-to-interference ratio for these packets is above the protection ratio of the receiver. Therefore, the failure probability of the packet transmissions depends only indirectly on the mean interference power or signal-to-interference ratio. The packet-failure probability is more influenced by the activity of the interferer. In addition, using the maximum and minimum of the measured signal-to-interference ratio samples as representative values is not satisfactory, since, if the protection ratio is between the maximum and minimum measured signal-to-interference ratio samples, it is completely unknown how likely a packet failure is.

Only a report that contains the complete empirical distribution of the observed signal-to-interference ratio sample (on a given carrier) contains all available information to determine how good the transmission quality is on that carrier. As described above, this is a rather complex description of the channel quality in terms of information quantity or memory requirements.

The described and other drawbacks are avoided by embodiments of the present invention, wherein the estimated packet (or packet part) failure probability is used as the measure to describe the transmission quality of a certain carrier used by a wireless packet data transmission system, instead of using (averaged) interference power or signal-to-interference ratio measurements on the certain carrier. The performance measure in accordance with principles of the present invention is well-suited to deliver accurate information on the influence of interference on the packet data transmission quality on that carrier, even if the interference is intermittent or otherwise strongly time-variant.

Although, with an approach in accordance with principles of the invention, information is discarded due to the real-valued information contained in a signal-to-interference ratio measurement sample being reduced to a single binary-valued information, it must be noted that the proposed signal-to-interference ratio observation is an instantaneous observation that is valid only for a single hypothetical packet that was transmitted at the respective point in time. Due to the strong variance in the signal-to-interference ratio observations and the non-linear relation between signal-to-interference ratio and packet failure probability, the average failure probability cannot be derived from the average signal-to-interference ratio.

Embodiments of the present invention permit the success and failure events of actually transmitted packets to be directly combined with the results of interference power measurements, thereby obtaining benefits of both schemes. In periods with high traffic load, many packet success or failure outcomes are available, and the system capacity is not further compromised by the interference-power measurement time. In periods with low traffic load, the additional time required to perform interference measurements is not critical, since the system is mainly idle anyway. Since both schemes deliver instantaneous estimates of the packet failure probability, the schemes can be easily combined.

The amount of data to spend in link-quality estimation reports can efficiently be further reduced by (e.g., binary) classification for each considered carrier. Especially in the case of frequency hopping with hop set adaptation, the classification is beneficial, since the decision-making device has to perform a binary decision (whether or not to use the respective carrier) anyway.

It can thus be seen that the received interference power or the received signal-to-interference ratio on a certain carrier is not an appropriate measure to estimate the transmission quality of a wireless packet data transmission system on that carrier, at least if intermittent or otherwise strongly time-variant interference is the main reason for transmission degradation.

The final link-quality criterion of a packet-data link is the packet failure rate or the failure rates of packet parts. The term packet failure, when used herein, also includes packet parts if the packet parts (e.g., packet segments) are protected by individual error detection codes (e.g., CRC).

The (estimated) packet failure rate is used as the performance measure of the transmission quality on a considered carrier. The packet failure rate on a given carrier can be assessed by, for example, the following two methods:

1) On each currently-used carrier, the packet failure rate can be assessed by the ratio of failed packets and transmitted packets on that carrier. Each packet transmission results in a binary result of the current transmission quality. This scheme does not require extra time to measure interference on the considered carrier (during which no wanted transmissions can take place). This is especially interesting if the wireless system is currently operating near the capacity limit (i.e., many transmitted packets are available to be evaluated), but only a small fraction of idle time remains that could be used for interference power measurements.

2) On all carriers (i.e., also on those carriers that are currently not used by a frequency hopping scheme), the packet failure rate can be assessed by the instantaneous received signal-to-interference ratio. The instantaneous received signal-to-interference ratio can, for example, be calculated from the measured samples of the interference power on the considered carrier (during times at which the system is not transmitting on that carrier), and an estimate of the received power of the wanted link (e.g., from measurements of earlier wanted transmissions on that carrier or from transmissions on neighbouring used carriers). Each measurement sample of the signal-to-interference ratio is transformed into a probability that a packet transmission at this signal-to-interference ratio would have failed (based on the physical layer performance of the receiver and optionally based also on the power measurement error distributions). In the simplest case, the transformation results in a binary decision whether the instantaneous signal-to-interference ratio is above or below the protection ratio of the receiver and consequently whether a fictive packet transmission at that time would have succeeded or failed.

A method in accordance with principles of the present invention can be employed to estimate the link quality on carriers that are currently not used for transmission and also to increase the number of observations on currently used carriers, if packets are transmitted only sparsely. In this case, it is not critical that the interference power measurements require time and therefore reduce the available system capacity.

Both of the above-described schemes for estimating the packet failure rate on a certain carrier can be easily combined, meaning that, for example, the packet failure or success events of received packets and the interference measurement samples on the same carrier with subsequent transformations to the estimated probabilities of a packet failure at these time instants can be used together.

The resulting sequence of (estimated or observed) packet failure/success events can then be filtered to obtain an estimate of, for example, the mean packet failure rate, which is a suitable condensed metric of the link quality on the considered carrier. As an alternative, additional processing of the filter output by a (hysteresis) comparator or a more complex type of classifier can further reduce the number of bits needed to represent the link quality of the considered carrier. In the simplest case, the output of the classification is binary, such that the link quality on the carrier is estimated as sufficient or insufficient.

If a classifier is used to compress the output of the carrier assessment data before transmission of the assessment report from the measuring device to the decision-making device, the decision-making device distributes information to all measuring devices on how to set the classification thresholds. The decision-making device distributes information to all measuring devices on how to set the classification thresholds because the classification thresholds are typically equal for all observed carriers and should be equal for all measuring devices; however, the thresholds should be adaptive (for all measuring units in parallel) depending on the overall interference situation on all carriers, especially if the classifications are binary. If the decision-making unit distributes the information on how to set the classification thresholds, the requirement that all slaves have the same thresholds at a given time is fulfilled, but the thresholds are still adaptive (for all measuring devices together). To support the proper setting of the classification thresholds by the decision-making device, the measuring units do not only report the outcomes of the classifications on all carriers in question, but also condensed metrics of the performance over all carriers in each classification category. For binary classification into 'clean' and 'interfered' channels, these could be, for example, the average (estimated) packet error rates for the 'clean' and the 'interfered' channels. This may be further accompanied by reliability information of the current classification results, e.g. the number of measurement samples that were used for the present report.

In the following, as an example of a data transmission system, a packet-oriented transmission system (e.g. a BLUETOOTH system) is chosen. The BLUETOOTH system is an ad-hoc system, meaning that there is no centralized mechanism to co-ordinate the access to a common frequency band of co-existing BLUETOOTH transmission systems. The absence of a centralized mechanism allows build-up and release of such a system whenever and wherever such a system is needed. However, the absence of a centralized access mechanism requires that an internal access mechanism controls access to the transmission channels in a way that avoids mutual blockings. For example, in BLUETOOTH, this is achieved by transmitting data in bursts, the bursts being transmitted on different frequencies. As each BLUETOOTH transmission system agrees on a pseudo-random order in which the frequencies are used, most of the time two co-existent systems will not use the same frequency. In case the same frequency is used at the same time, the two systems interfere for the time of a burst, and both bursts will be destroyed by this mutual interference. However, via automatic retransmission requests, both bursts will be repeated. Due to the pseudo-random hopping, it is likely that the re-transmission will occur on different frequencies.

There are methods to reduce the probability of destructed bursts by adaptively selecting the frequency hopping set. If one BLUETOOTH system experiences high interference on certain frequencies, these frequencies should be avoided. On the other hand, unused frequencies should be checked for their interference properties in order to include these frequencies in the hopping list or to substitute a high-interfered frequency in the hopping list with a lower-interfered frequency.

In a BLUETOOTH system there is always a master that serves one or more slaves. The slave always has to maintain only one connection (e.g. to the master). In contrast, the master may maintain more than one connection. Thus, the probability is typically greater for a slave than for a master to have some idle time to perform interference measurements. Therefore, in the following the interference measurements are implemented particularly (but not necessarily exclusively) in the slaves, and a report of the measurements is sent from each slave to the master. Based on these measurement reports, the control logic of the master decides if the set of frequencies used for hopping should be changed. In other words, a frequency contained in the current hoping list is substituted by a frequency that is currently not included in that list or, if the hopping list even may be extended, by adding one or more other frequencies.

FIG. 1 illustrates a flow 100. The flow 100 depicts operation of that part of the control software in the slave that is used for receiving bursts and that is used for collecting the interference measurements. For sake of clarity the part in which safely received packets are processed is not shown. For the same reason it is also not shown how the transmission of bursts from the slave to the master is controlled. If in the next time slot a burst has to be received the slave is not in the "idle-mode". The receiver tunes to the next frequency of the hopping list and tries to receive a burst from its master (block 110). For each receive attempt the signal power is measured. If a burst is received safe, that means the CRC is ok (decision block 112) then the measured signal power corresponds to a great extend to the signal power of the received burst. Therefore in case of safe received burst the measured signal power is stored as the payload signal power (block 116). Depending on how much interference was superimposed to the payload burst the real signal power of the received burst may be somewhat less. However if the ratio between payload signal power and interference signal power is too low (lower than for example 10 dB) than the payload burst will not be recovered safely. In this case the CRC is not ok and the measured signal power is not taken into account. Instead a packet failure counter is incremented (block 114). For sake of simplicity of the measurement method it is assumed that in the frequency band chosen for BLUETOOTH the fading is distributed even over all frequencies. Therefore all valid payload signal power values are averaged in a moving average (block 116) without respect to at which frequency they have been measured. As the BLUETOOTH system is designed to be portable but not to be moved at speeds higher than the speed of a walking human a relatively long moving average time (some tenths of a second) may be chosen to take into account signal power changes due to position changes between master and slave. However in case of a packet failure this failure is strongly correlated to the receiving frequency the packet failures are accumulated separately for each frequency. The result of the measurement is collected in a interference frequency list where for each examined frequency a moving average over a certain number of preceding evaluation results ("packet failure"/"packet success") is kept.

In case the slave is in an idle-mode (YES branch of decision block 102) the idle mode is used for collecting interference information about non-used frequencies, i.e. frequencies that are not included in the hopping list. Which frequencies should be evaluated may be proposed by the master in a respective control message or may be selected by the slave on its own initiative. In idle mode the slave first tunes its receiver to the frequency that has to be evaluated (block 104). Then the signal power on this frequency is measured (block 106). As this frequency is not used for that specific transmission between master and slave all signal power measured is considered as interference signal power. The ratio of the last valid measured signal power of step 116 (or the moving average power of step 116) and the currently measured interference power of step 106 is calculated at step 108 as a fictive signal-to-interference ratio value for the chosen frequency. The trick is that if a payload packet would have been sent on the chosen frequency it would have experienced with a high probability the same fading situation and without doubt exactly the same interference situation as measured in step 106. Due to the effects of Raleigh fading etc. that are not constant over the frequencies this assumption is not correct. However as the described measurement is not interested in a singular measurement but wants to look at a long time averaged reliability information on the examined frequencies the effects of Raleigh fading etc. are taken fully into account by a subsequent filtering. To condense the information that is achieved by the fictive signal-to-interference ratio values the present embodiment classifies the fictive signal-to-interference ratio values. As the outcome of the measurement should be an information how reliable a possible candidate for a new frequency is in comparison to the actual used frequencies such a classification can be reduced to a binary statement: if a packet would have been transmitted that packet would have been received safely or it would have been destroyed. Therefore in this embodiments each calculated fictive signal-to-interference ratio value is mapped to the values "packet failure" or "packet success" in block 108. In the next step 118, that is also performed in case the receiver was not in idle mode, the interference frequency list is updated.

From time to time the interference frequency list has to be reported to the master thus that the master can take a decision on how to update its hopping list. To avoid to transmit to much measurement data that interference frequency list also may be subjected to a threshold decision. If a given threshold is exceeded the respective frequency is considered not to be an appropriate candiadate for an update of the hopping list and it is sufficient to transmit this decision as a binary result. By this the number of bits in the report is restricted to the number of examined frequencies. The master may influence the report by setting the threshold value for the report.

Figure 2:
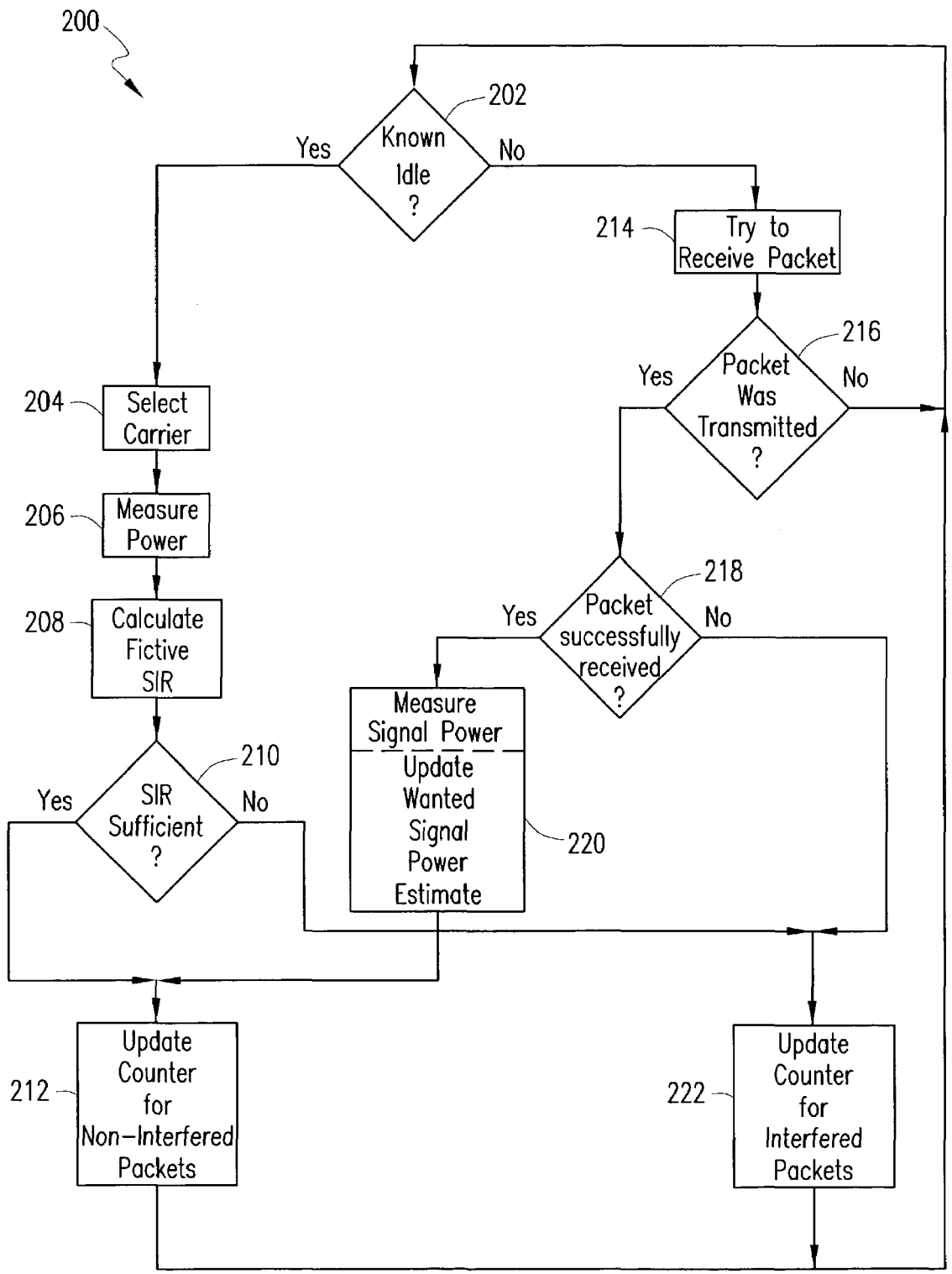
FIG. 2 shows a diagram with method steps of another embodiment of the invention.

FIG. 2 illustrates a flow 200. The flow 200 depicts operation of another embodiment of the present invention. In the flow 200, operation is shown of that part of the control software in the master and the slaves used for receiving bursts and for collecting the interference measurements. For sake of clarity, the part in which correctly-received packets are further processed is not shown. For the same reason, it is also not shown how the transmission of bursts from the slave to the master (or vice versa) is controlled.

The flow 200 begins at step 202. At step 202, a determination is made whether a receiver is in idle mode. If, in the next time slot, a burst has to be received, the receiver is not in the idle mode. The receiver tunes to the next frequency of the hopping sequence and tries to receive a burst from the transmitting unit (block 214). For each receive attempt, the signal power is measured. If a burst is received correctly, meaning that the CRC is OK (decision block 218), the measured signal power corresponds to a great extent to the signal power of the received burst. Therefore, in case of a correctly received burst, the measured signal power is stored as the wanted signal power. Depending on how much interference was superimposed to the packet burst, the real wanted signal power of the received burst may be somewhat less. Further, a packet success counter is incremented (block 212). However, if the ratio between wanted signal power and interference signal power is too low (e.g., lower than 10 dB), then the payload burst will not be recovered correctly. In this case, the CRC is not OK and the measured signal power is not taken into account. Instead, a packet failure counter is incremented (block 222). For sake of simplicity, it is assumed that, in the frequency band chosen for BLUETOOTH, the fading is well-distributed over all frequencies.

Therefore, all valid wanted signal power values are averaged in a moving average (block 220) irrespective of at which frequency they have been measured. As the BLUETOOTH system is designed to be portable, but not to be moved at speeds higher than the speed of a walking human, a relatively long moving average time (e.g., some tenths of a second) may be chosen in order to take into account signal power changes due to position changes between master and slave. However in case of a packet failure that is strongly correlated to the receiving frequency, the packet failures are accumulated separately for each frequency. The result of the measurement is collected in a list where, for each examined frequency, a moving average over a certain number of preceding evaluation results ("packet failure"/"packet success") is kept. As described above, a more general filter approach can also be used instead of the above-described counter approach.

In case the slave unit is in an idle mode (YES branch of decision block 202), the idle mode may be used for collecting interference information about used or non-used frequencies (i.e., frequencies that are or are not included in the hopping list). Which frequencies should be evaluated may be proposed by the master in a respective control message or may be selected on the unit's own initiative. For this idle mode interference measurement, the unit first tunes a receiver of the unit to the frequency that has to be evaluated (block 204). Next, the signal power on the frequency to be evaluated is measured (block 206). As the frequency to be evaluated is not used for that specific transmission between master and slave, all signal power measured is considered as interference signal power. A ratio of the last valid measured signal power in measurement step 220 (or some meaningful statistics thereof, such as, for example, a moving average) and the currently-measured interference signal power of step 206 is calculated as a fictive signal-to-interference ratio value for the chosen frequency at the time of the measurement (block 208). The trick is that, if a packet had been sent on the chosen frequency, the payload packet would have experienced, with a high probability, the same fading situation and without doubt exactly the same interference situation as measured in step 206. Due to the effects of Raleigh fading, etc. . . . that are not constant over the frequencies, this assumption is not totally correct for the wanted signal power. However, as the described measurement is not interested in a singular measurement but wants to look at a long time averaged reliability information on the examined frequencies, the effects of Raleigh fading etc. are taken fully into account by subsequent filtering. To condense the information that is achieved by the fictive signal-to-interference ratio values, the present embodiment classifies the fictive signal-to-interference ratio values. As the outcome of the measurement should be information regarding how reliable a possible candidate for a new frequency is in comparison to the actual used frequencies, such a classification can be reduced to a binary statement: if a packet had been transmitted, that packet would have been received correctly or would have been destroyed. Therefore, in this embodiment, each calculated fictive signal-to-interference ratio value is mapped to the values "packet failure" or "packet success" in block 210. In the next step 212 or 222, that are also performed in case the receiver was not in idle-mode, the evaluation of the frequency individual performance is updated.

From time to time the frequency individual performance (e.g., packet failure rate) determined at a slave has to be reported to the master so that the master can decide how to update a hopping list of the master. To avoid transmitting too much measurement data, that list of frequency individual packet failure rates also may be subjected to a threshold decision. If a given threshold is exceeded, the respective frequency is considered not to be an appropriate candidate for an update of the hopping list. It is sufficient to transmit this decision as a binary result. By this the number of bits in the report is restricted to the number of examined frequencies. The master may influence the report by setting the threshold value for the report.

What is claimed is:

1. A method of evaluating an interference situation of a transmission system, the method comprising the steps of:
   responsive to receipt of valid payload data, increasing a counter for valid receptions and storing a valid-payload-data signal power,
   responsive to receipt of invalid payload data, increasing a counter for invalid receptions, and
   responsive to receipt of no payload data:
      measuring signal power in order to consider the signal power as interference power, wherein the measuring step is performed individually for separate carrier frequencies; and
      calculating a ratio of the signal power measured during a valid reception and the interference power as a fictive signal-to-interference power ratio, wherein the fictive signal-to-interference power ratio is classified, the classification comprising a mapping to a binary value, and the binary mapping of the fictive signal-to-interference power ratio is combined with the packet failure or success results as determined in the first and second increasing steps.

2. A transmission system having at least a first transceiver and a second transceiver, the system comprising:
   means for increasing a counter for valid receptions and storing a valid-payload-data signal power responsive to receipt of valid payload data,
   means for increasing a counter for invalid receptions responsive to receipt of invalid payload data; and
   means for measuring signal power in order to consider the signal power as interference power responsive to receipt of no payload data; and
   means for calculating a ratio of the signal power measured during a valid reception and the interference power as a fictive signal-to-interference power ratio responsive to receipt no payload data, wherein the fictive signal-to-interference power ratio is classified;
   Wherein, a report of the measurement is transmitted from a first transceiver to a second transceiver, and the second transceiver decides, based on the transmitted measurement, on which frequencies the transmissions are carried out;
   wherein the second transceiver sends to the first transceiver a value of a threshold, based on which the first transmitter performs the carrier individual decision whether sufficient performance is observed on a respective carrier; and
   wherein the measurement report from the first transceiver to the second transceiver is accomplished by reliability information about current classification results.

3. A method of evaluating an interference situation of a transmission system, the method comprising the steps of:
   responsive to receipt of valid payload data, increasing a counter for valid receptions and storing a valid-payload-data signal power;
   responsive to receipt of invalid payload data, increasing a counter for invalid receptions; and
   responsive to receipt of no payload data:

measuring signal power in order to consider the signal power as interference power, wherein the measuring step is performed individually for separate carrier frequencies;

calculating a ratio of the signal power measured during a valid reception and the interference power as a fictive signal-to-interference power ratio, wherein the fictive signal-to-interference power ratio is classified, the classification comprising a mapping to a binary value, wherein the binary mapping of the fictive signal-to-interference power ratio is combined with the packet failure or success results as determined in the first and second increasing steps;

determining whether a signal-to-interference ratio is sufficient;

responsive to a determination that the signal-to-interference ratio is sufficient, increasing the counter for valid receptions; and responsive to a determination that the signal-to-interference ratio is not sufficient, increasing the counter for invalid receptions.

4. A transmission system having at least a first transceiver and a second transceiver, the system comprising:

means for increasing a counter for valid receptions and storing a valid-payload-data signal power responsive to receipt of valid payload data;

means for increasing a counter for invalid receptions responsive to receipt of invalid payload data;

means for measuring signal power in order to consider the signal power as interference power responsive to receipt of no payload data;

means for calculating a ratio of the signal power measured during a valid reception and the interference power as a fictive signal-to-interference power ratio responsive to receipt no payload data, wherein the fictive signal-to-interference power ratio is classified;

means for determining whether a signal-to-interference ratio is sufficient responsive to receipt of no payload data;

means for increasing the counter for valid receptions responsive to a determination that the signal-to-interference ratio is sufficient; and means for increasing the counter for invalid receptions responsive to a determination that the signal-to-interference ratio is not sufficient, wherein:

a report of the measurement is transmitted from a first transceiver to a second transceiver, wherein the measurement report from the first transceiver to the second transceiver is accomplished by reliability information about current classification results; and the second transceiver decides, based on the transmitted measurement, on which frequencies the transmissions are carried out, wherein the second transceiver sends to the first transceiver a value of a threshold, on which the first transmitter performs the carrier individual decision whether sufficient performance is observed on a respective carrier.

* * * * *